(12) United States Patent
Hasegawa

(10) Patent No.: US 10,997,844 B2
(45) Date of Patent: May 4, 2021

(54) IMAGE FORMING APPARATUS, MANAGEMENT APPARATUS, IMAGE FORMING SYSTEM, AND NON-TRANSITORY COMPUTER READABLE MEDIUM STORING PROGRAM TO PROVIDE FOR EVACUATION INFORMATION WHEN A DEVICE IS UNABLE TO OUTPUT SUCH INFORMATION

(71) Applicant: FUJI XEROX CO., LTD., Tokyo (JP)

(72) Inventor: Masashi Hasegawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/695,262

(22) Filed: Nov. 26, 2019

(65) Prior Publication Data

US 2020/0394889 A1 Dec. 17, 2020

(30) Foreign Application Priority Data

Jun. 14, 2019 (JP) .............................. JP2019-110842

(51) Int. Cl.
*G08B 21/10* (2006.01)
*G06F 3/12* (2006.01)
*G08B 27/00* (2006.01)

(52) U.S. Cl.
CPC ............ *G08B 21/10* (2013.01); *G06F 3/1256* (2013.01); *G06F 3/1291* (2013.01); *G06F 3/1293* (2013.01); *G08B 27/005* (2013.01)

(58) Field of Classification Search
None
See application file for complete search history.

(56) References Cited

U.S. PATENT DOCUMENTS 8,958,088 B2* 2/2015 Uchida .............. H04N 1/32106
358/1.13
2005/0030574 A1* 2/2005 McVey ................. G06F 3/1286
358/1.14

FOREIGN PATENT DOCUMENTS

JP 2010-034638 A 2/2010

OTHER PUBLICATIONS

Machine translation of Japanese Pat. Appl. No. 2010-034638 to Satori et al., published Feb. 2010.*
Machine translaton of Japanese Pat. Appl. No. 2007-220006 to Yoshida et al., published Aug. 2008.*

* cited by examiner

*Primary Examiner* — Paul F Payer
(74) *Attorney, Agent, or Firm* — Oliff PLC

(57) ABSTRACT

An image forming apparatus includes a memory that stores evacuation information for use in an event of a disaster, a printer that prints the evacuation information stored in the memory in the event of a disaster, and a display controller that performs, if the printer is unable to print the evacuation information, control to display information on an installation place of a different image forming apparatus that is able to print the evacuation information in place of the image forming apparatus.

7 Claims, 16 Drawing Sheets

FIG. 7

| APPARATUS NUMBER | BASIC INFORMATION | | | PRINTABLE EVACUATION INFORMATION | DISASTER-RELATED INFORMATION | | |
|---|---|---|---|---|---|---|---|
| | INSTALLATION PLACE | INSTALLATION PLACE CATEGORY | DATE OF UPDATE | | SUBSTITUTE APPARATUS | ORIGINAL EVACUATION INFORMATION HOLDING APPARATUS | DATE OF UPDATE |
| 1 | 2-1 AAA TOWN, BBB CITY | CONVENIENCE STORE | 2/6/2016 | 1 | 3, 4, 10 | 4, 10, 11, 12 | 3/4/2019 |
| 2 | 2-6 AAA TOWN, BBB CITY | OFFICE | 4/5/2013 | 2 | | | 2/7/2019 |
| 3 | 3-2 AAA TOWN, BBB CITY | CONVENIENCE STORE | 10/3/2017 | 3 | 4, 10 | 1, 4, 10, 11 | 3/3/2019 |
| 4 | 4-1-5 AAA TOWN, BBB CITY | CONVENIENCE STORE | 8/10/2015 | 4 | 1, 3, 10 | 1, 3, 10, 12 | 3/4/2018 |
| 5 | 4-9 CCC TOWN, BBB CITY | OFFICE | 9/9/2018 | 5 | | | 4/12/2019 |
| 6 | 11-2 DDD TOWN, BBB CITY | OFFICE | 1/6/2019 | 6 | | | 11/9/2018 |
| 7 | 44-1 EEE TOWN, BBB CITY | SCHOOL | 3/10/2012 | 7 | | | 3/3/2019 |
| 8 | 17-9 DDD TOWN, BBB CITY | OFFICE | 7/8/2016 | 8 | | | 8/11/2018 |
| 9 | 2-1-4 FFF TOWN, BBB CITY | CITY HALL | 12/1/2018 | 9 | | | 9/7/2018 |
| 10 | 13-1 GGG TOWN, BBB CITY | CONVENIENCE STORE | 11/28/2017 | 10 | 1, 3, 4 | 1, 3, 4 | 4/23/2018 |
| 11 | 4-1-2 HHH TOWN, III CITY | CONVENIENCE STORE | 3/8/2016 | 11 | 1, 3 | | 10/11/2018 |
| 12 | 5-13 JJJ TOWN, III CITY | CONVENIENCE STORE | 10/9/2018 | 12 | 1, 4 | | 4/1/2019 |

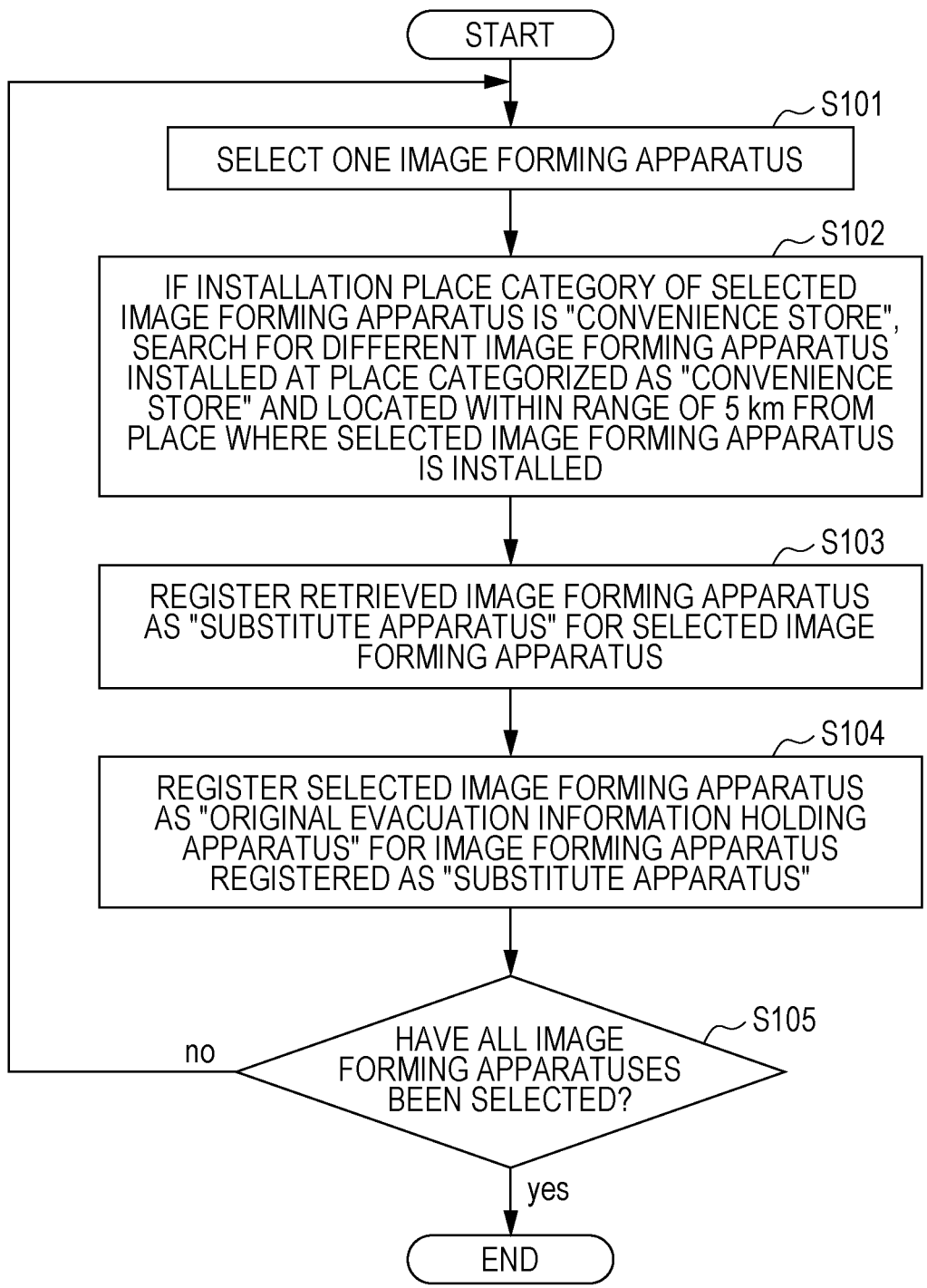

FIG. 9

| INFORMATION TYPE | | | | |
|---|---|---|---|---|
| BASIC INFORMATION | PRINTABLE EVACUATION INFORMATION | | | 1 |
| SUPPLEMENTARY INFORMATION | ORIGINAL EVACUATION INFORMATION HOLDING APPARATUS | APPARATUS NUMBER | INSTALLATION PLACE | PRINTABLE EVACUATION INFORMATION |
| | | 4 | 4-1-5 AAA TOWN, BBB CITY | 4 |
| | | 10 | 13-1 GGG TOWN, BBB CITY | 10 |
| | | 11 | 4-1-2 HHH TOWN, III CITY | 11 |
| | | 12 | 5-13 JJJ TOWN, III CITY | 12 |
| | SUBSTITUTE APPARATUS | 3 | 3-2 AAA TOWN, BBB CITY | |
| | | 4 | 4-1-5 AAA TOWN, BBB CITY | |
| | | 10 | 13-1 GGG TOWN, BBB CITY | |

FIG. 10

| DISPLAY MODE | NORMAL |
| --- | --- |
|  | DISASTER |
| PRINTABILITY | YES |
|  | NO |

FIG. 15

EVACUATION MAP PRINTING

WE ARE SORRY FOR UNAVAILABILITY OF EVACUATION MAP PRINTING DUE TO LACK OF PAPER. PLEASE ACCESS ANY PLACE BELOW TO PRINT EVACUATION MAP YOU WANT.

|   | TYPE | ADDRESS |
|---|---|---|
| 1 | CONVENIENCE STORE | 3-2 AAA TOWN, BBB CITY |
| 2 | CONVENIENCE STORE | 4-1-5 AAA TOWN, BBB CITY |
| 3 | CONVENIENCE STORE | 13-1 GGG TOWN, BBB CITY |

IMAGE FORMING APPARATUS, MANAGEMENT APPARATUS, IMAGE FORMING SYSTEM, AND NON-TRANSITORY COMPUTER READABLE MEDIUM STORING PROGRAM TO PROVIDE FOR EVACUATION INFORMATION WHEN A DEVICE IS UNABLE TO OUTPUT SUCH INFORMATION

CROSS-REFERENCE TO RELATED APPLICATIONS

This application is based on and claims priority under 35 USC 119 from Japanese Patent Application No. 2019-110842 filed Jun. 14, 2019.

BACKGROUND

(i) Technical Field

The present disclosure relates to an image forming apparatus, a management apparatus, an image forming system, and a non-transitory computer readable medium storing a program.

(ii) Related Art

Japanese Unexamined Patent Application Publication No. 2010-034638 discloses a printer with an evacuation information receiving function. When an earthquake early warning is received, the printer reads, from a memory, prestored map information indicating a shelter and automatically prints the map information. Thus, users may easily locate the shelter even if a power outage occurs in a while after the disaster.

SUMMARY

Aspects of non-limiting embodiments of the present disclosure relate to the following circumstances. If one image forming apparatus is unable to print evacuation information in the event of a disaster, users may desirably grasp information on other image forming apparatuses that are able to print the evacuation information in place of the one image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising a memory that stores evacuation information for use in an event of a disaster, a printer that prints the evacuation information stored in the memory in the event of a disaster, and a display controller that performs, if the printer is unable to print the evacuation information, control to display information on an installation place of a different image forming apparatus that is able to print the evacuation information in place of the image forming apparatus.

BRIEF DESCRIPTION OF THE DRAWINGS

An exemplary embodiment of the present disclosure will be described in detail based on the following figures, wherein:

FIG. 7 illustrates an example of an evacuation information management table stored in an evacuation information storing part;

FIG. 8 is a flowchart for illustrating an operation for determining a substitute apparatus by a substitute apparatus determining part of the management server;

FIG. 9 illustrates an example of transmission information to be generated by a transmission information generating part;

FIG. 10 illustrates an example of display control information held in the image forming apparatus;

FIG. 15 illustrates Operation Screen Example 4 showing an operation screen to be displayed on the image forming apparatus.

DETAILED DESCRIPTION

An exemplary embodiment of the present disclosure is described in detail with reference to the drawings.

Figure 1:
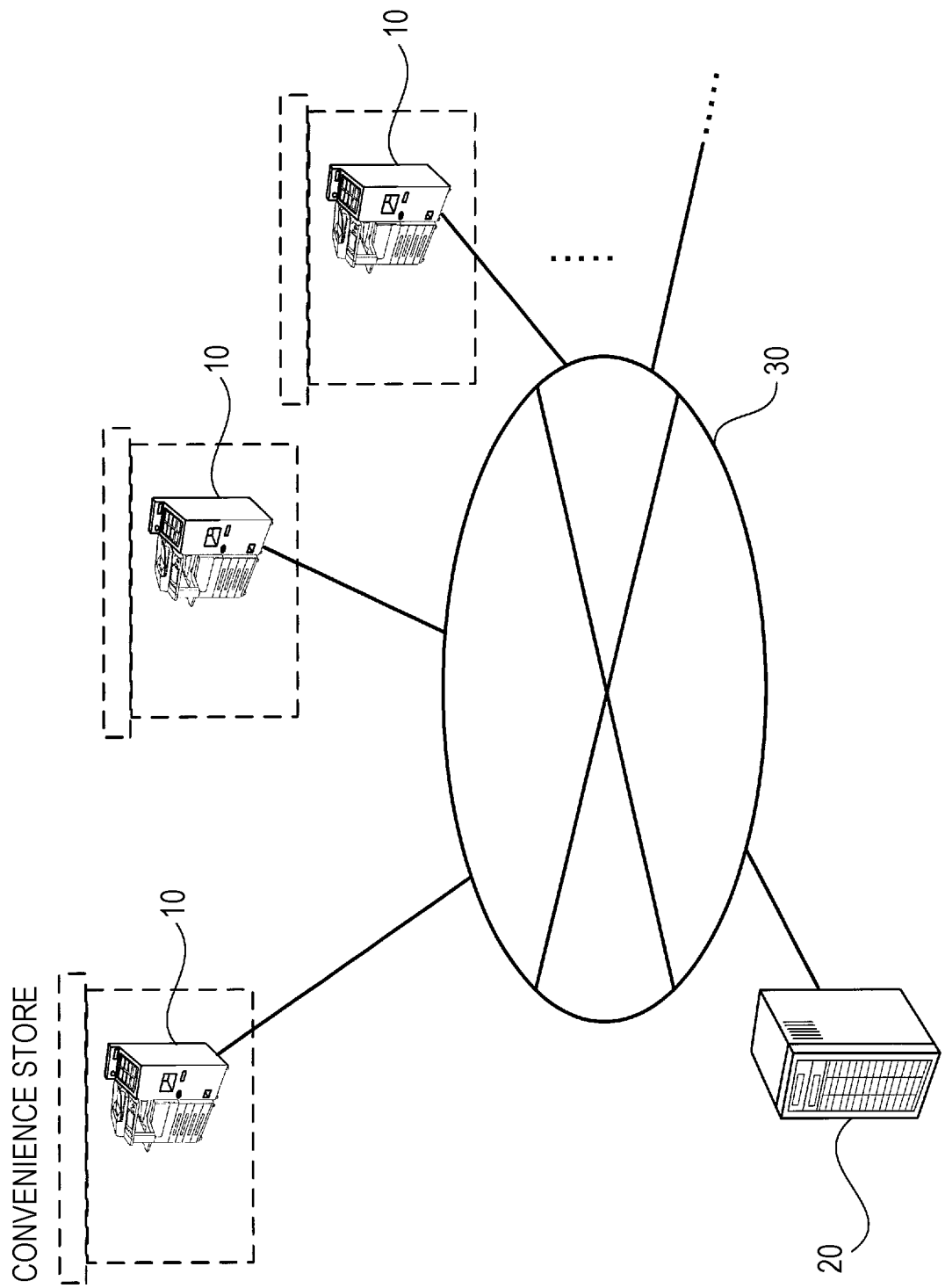
FIG. 1 illustrates the configuration of an image forming system according to an exemplary embodiment of the present disclosure.

FIG. 1 illustrates the configuration of an image forming system according to the exemplary embodiment of the present disclosure.

As illustrated in FIG. 1, the image forming system according to the exemplary embodiment of the present disclosure includes a plurality of image forming apparatuses 10 each installed in a convenience store, an office, a school, a shop, or the like, and a management server 20 that manages the plurality of image forming apparatuses 10. The plurality of image forming apparatuses 10 and the management server 20 are connected to each other via a network 30 such as the Internet.

The image forming apparatus 10 is a so-called multifunction peripheral having a plurality of functions such as a printing function, a scanning function, a copying function, and a facsimile function.

In a normal mode of the image forming apparatus 10, users who come to a convenience store may use various functions such as the printing function by paying a fee by cash or electronic money.

The management server 20 is a management apparatus that manages information on, for example, installation places and installation place categories of the plurality of image forming apparatuses 10.

The image forming apparatus 10 has a function of printing, in the event of a disaster such as an earthquake, free evacuation information including information on a shelter around the installation place, a place where food will be supplied, and notice on the disaster. Specifically, the image forming apparatus 10 stores print information for evacuation information and, when the image forming apparatus 10 detects the occurrence of a disaster by receiving information indicating the occurrence of an earthquake, the image forming apparatus 10 proceeds to a disaster mode to print the evacuation information through a user's operation without billing the user.

Figure 2:
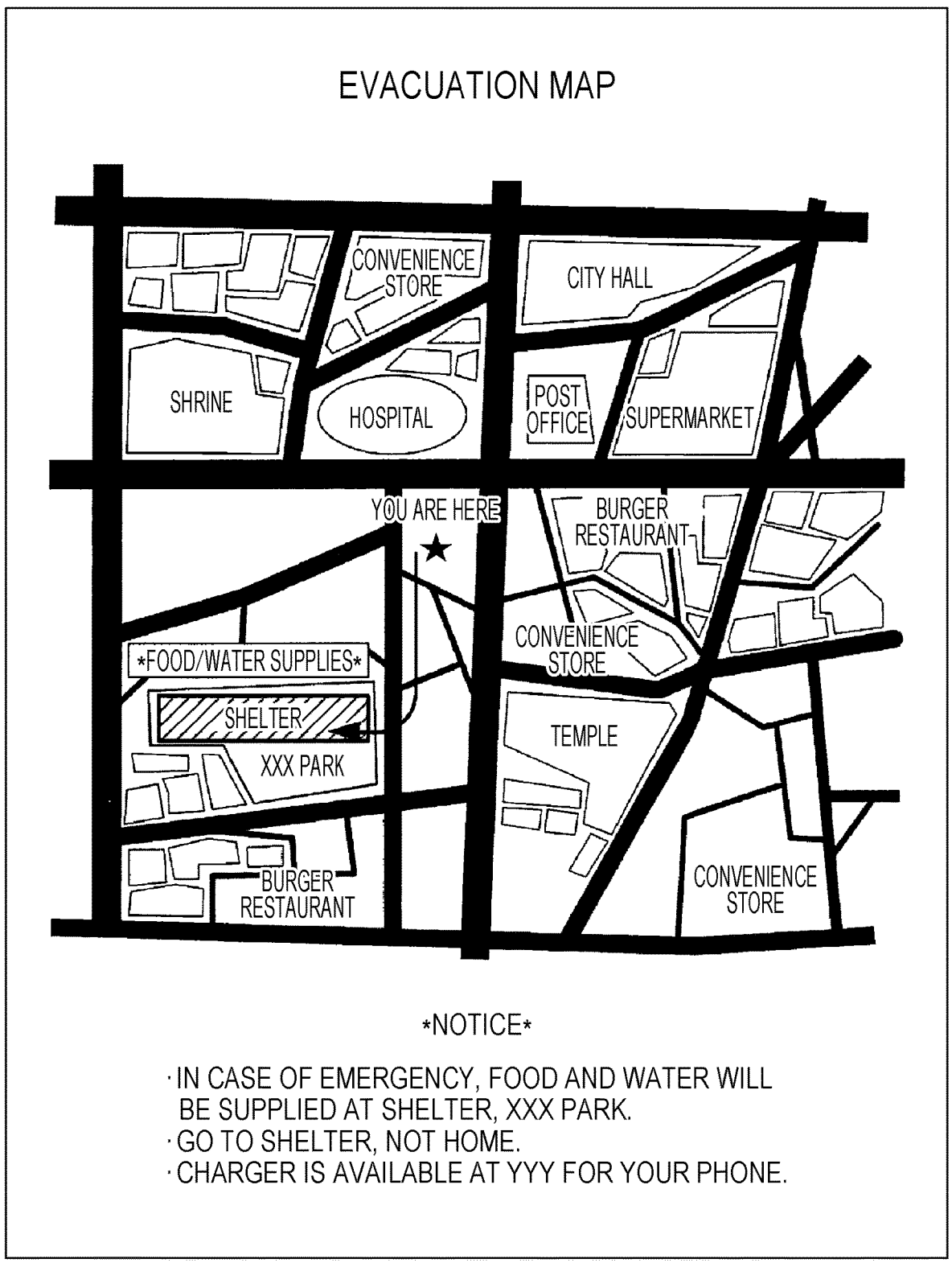
FIG. 2 illustrates an example of evacuation information to be printed by an image forming apparatus.

FIG. 2 illustrates an example of evacuation information to be printed by the image forming apparatus 10. In the event of a disaster, a user who comes to a convenience store may obtain free paper on which evacuation information is printed as illustrated in FIG. 2.

If the image forming apparatus 10 proceeds to the disaster mode in response to detection of a disaster but lacks consumables such as toner or print paper, the image forming apparatus 10 is unable to print evacuation information.

In particular, in the disaster mode of the image forming apparatus 10, users may print evacuation information for free and therefore the expected number of printed copies is larger than usual. Thus, there is a strong possibility that the image forming apparatus 10 is unable to print the evacuation information due to lack of consumables.

This exemplary embodiment provides the following configuration so that, if one image forming apparatus is unable to print evacuation information in the event of a disaster, users may grasp information on other image forming apparatuses that are able to print the evacuation information in place of the one image forming apparatus.

Figure 3:
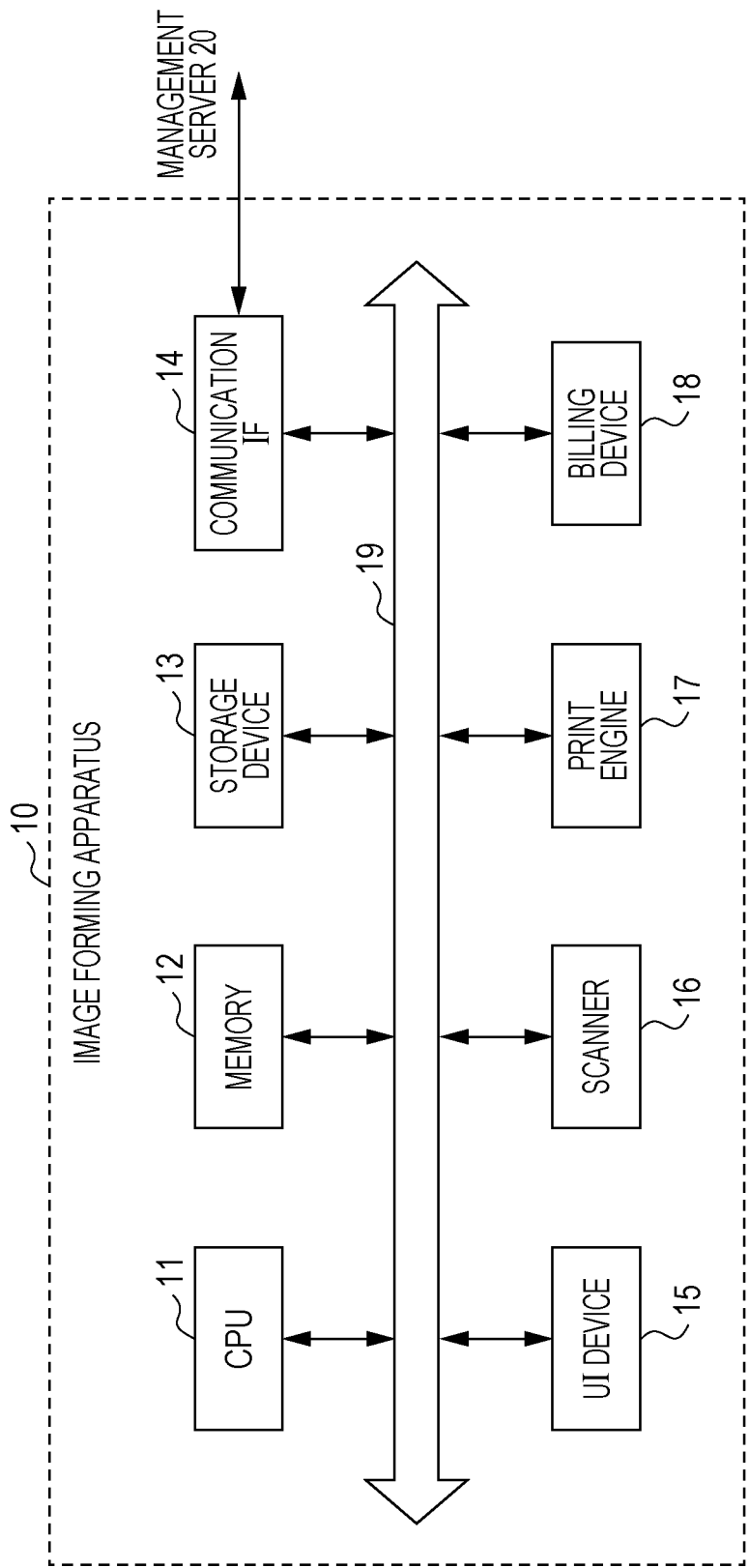
FIG. 3 is a block diagram illustrating the hardware configuration of the image forming apparatus according to the exemplary embodiment of the present disclosure.

FIG. 3 illustrates the hardware configuration of the image forming apparatus 10 of the image forming system according to this exemplary embodiment.

As illustrated in FIG. 3, the image forming apparatus 10 includes a CPU 11, a memory 12, a storage device 13 such as a hard disk drive, a communication interface (abbreviated as IF) 14 that transmits data to and receives data from external apparatuses or the like via the network 30, a user interface (abbreviated as UI) device 15 including a touch panel or a combination of a liquid crystal display and a keyboard, a scanner 16, a print engine 17, and a billing device 18. Those components are connected to each other via a control bus 19.

The print engine 17 prints an image on a recording medium such as print paper through charging, exposure, developing, transfer, fixing, and other steps.

The CPU 11 controls an operation of the image forming apparatus 10 by executing predetermined processing based on a control program stored in the memory 12 or the storage device 13. In this exemplary embodiment, the CPU 11 reads and executes the control program stored in the memory 12 or the storage device 13 but the program may be provided to the CPU 11 by being stored in a storage medium such as a CD-ROM.

Figure 4:
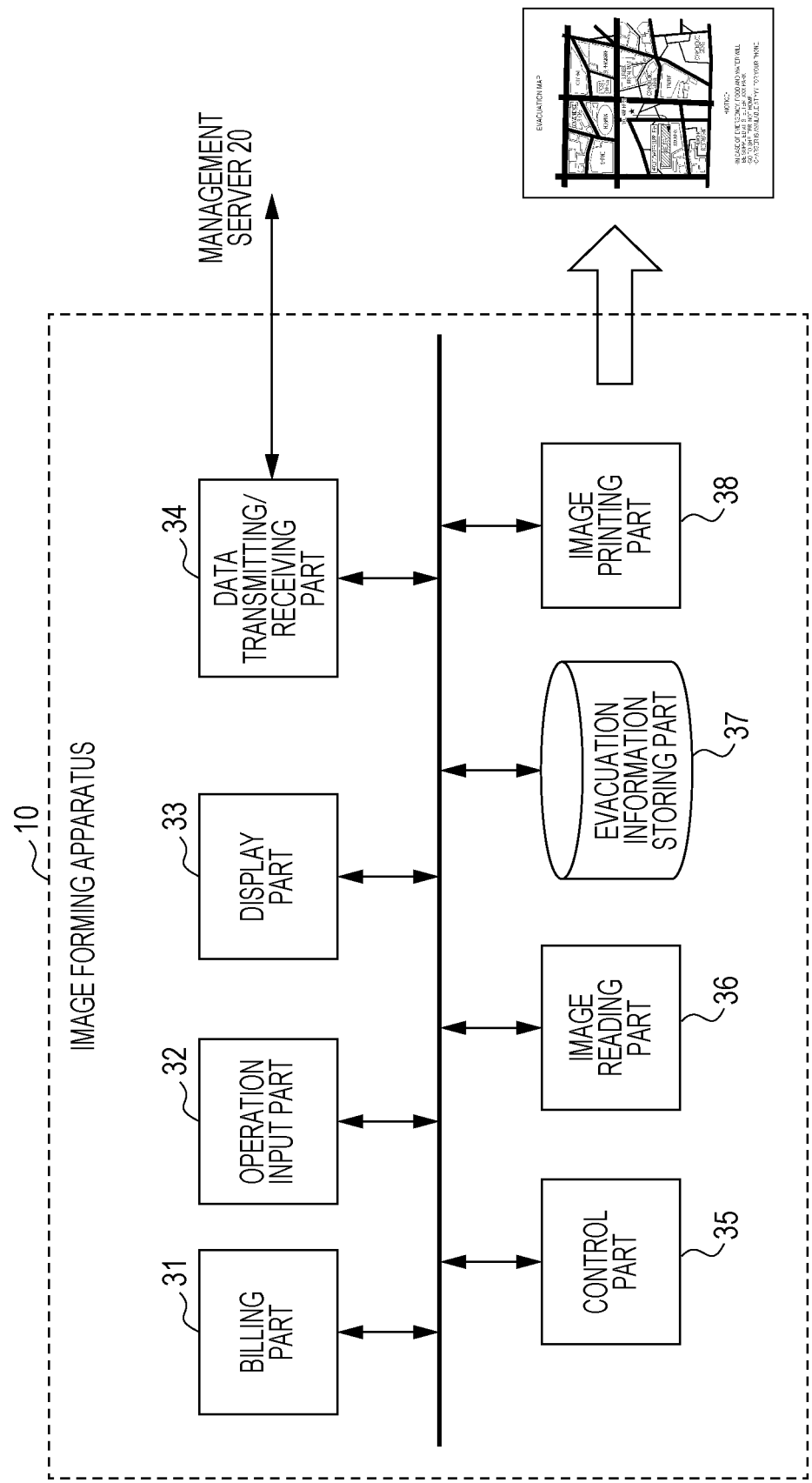
FIG. 4 is a block diagram illustrating the functional configuration of the image forming apparatus according to the exemplary embodiment of the present disclosure.

FIG. 4 is a block diagram illustrating the functional configuration of the image forming apparatus 10, which is implemented by executing the control program.

As illustrated in FIG. 4, the image forming apparatus 10 of this exemplary embodiment includes a billing part 31, an operation input part 32, a display part 33, a data transmitting/receiving part 34, a control part 35, an image reading part 36, an evacuation information storing part 37, and an image printing part 38.

The display part 33 is controlled by the control part 35 to display various types of information for users. The operation input part 32 inputs information on various operations performed by users.

The image printing part 38 prints an image on a recording medium such as print paper based on control of the control part 35.

The control part 35 controls the image reading part 36, the image printing part 38, and the like based on operation information input by the operation input part 32 to execute printing processing, copying processing, and the like.

The billing part 31 bills a user when the user executes the printing processing or the copying processing. The data transmitting/receiving part 34 transmits data to and receives data from the management server 20.

The evacuation information storing part 37 stores evacuation information for use in the event of a disaster. The image forming apparatus 10 stores the evacuation information because the network 30 may be interrupted in the event of a disaster and no communication may be established with the management server 20.

In the event of a disaster, the control part 35 controls the image printing part 38 to print the evacuation information stored in the evacuation information storing part 37 on a recording medium such as print paper.

That is, the image printing part 38 is a printer that prints the evacuation information stored in the evacuation information storing part 37 in the event of a disaster.

If the image printing part 38 of one image forming apparatus is unable to print evacuation information due to lack of consumables or the like, the control part 35 controls the display part 33 to display information on installation places of other image forming apparatuses that are able to print the evacuation information in place of the one image forming apparatus.

The case where the image printing part 38 is unable to print the evacuation information due to lack of consumables or the like includes not only a case where the image forming apparatus lacks print paper or color materials such as toner but also a case where the image forming apparatus has jammed or malfunctioned mechanically.

The evacuation information storing part 37 stores not only evacuation information to be printed by its image forming apparatus, that is, evacuation information on an area where its image forming apparatus is installed, buts also evacuation information on other areas.

If the image printing part 38 is able to print evacuation information, the control part 35 displays information on other areas whose evacuation information is printable. If a user views the displayed information and gives an instruction to print evacuation information of a different area, the control part 35 controls the image printing part 38 to print the evacuation information of the different area.

Figure 5:
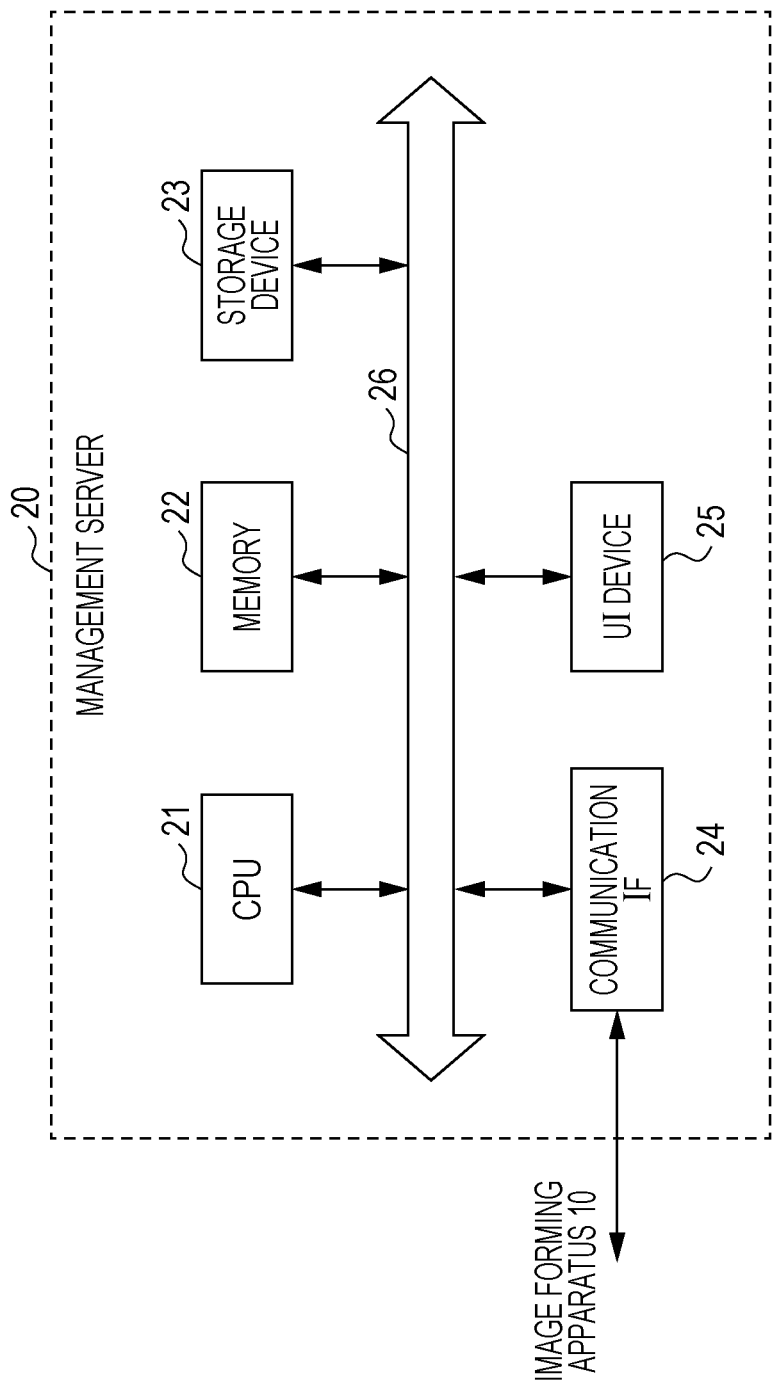
FIG. 5 is a block diagram illustrating the hardware configuration of a management server according to the exemplary embodiment of the present disclosure.

FIG. 5 illustrates the hardware configuration of the management server 20 of the image forming system according to this exemplary embodiment.

As illustrated in FIG. 5, the management server 20 includes a CPU 21, a memory 22, a storage device 23 such as a hard disk drive, a communication IF 24 that transmits data to and receives data from external apparatuses or the like via the network 30, and a UI device 25 including a touch panel or a combination of a liquid crystal display and a keyboard. Those components are connected to each other via a control bus 26.

The CPU 21 controls an operation of the management server 20 by executing predetermined processing based on a control program stored in the memory 22 or the storage device 23. In this exemplary embodiment, the CPU 21 reads and executes the control program stored in the memory 22 or the storage device 23 but the program may be provided to the CPU 21 by being stored in a storage medium such as a CD-ROM.

Figure 6:
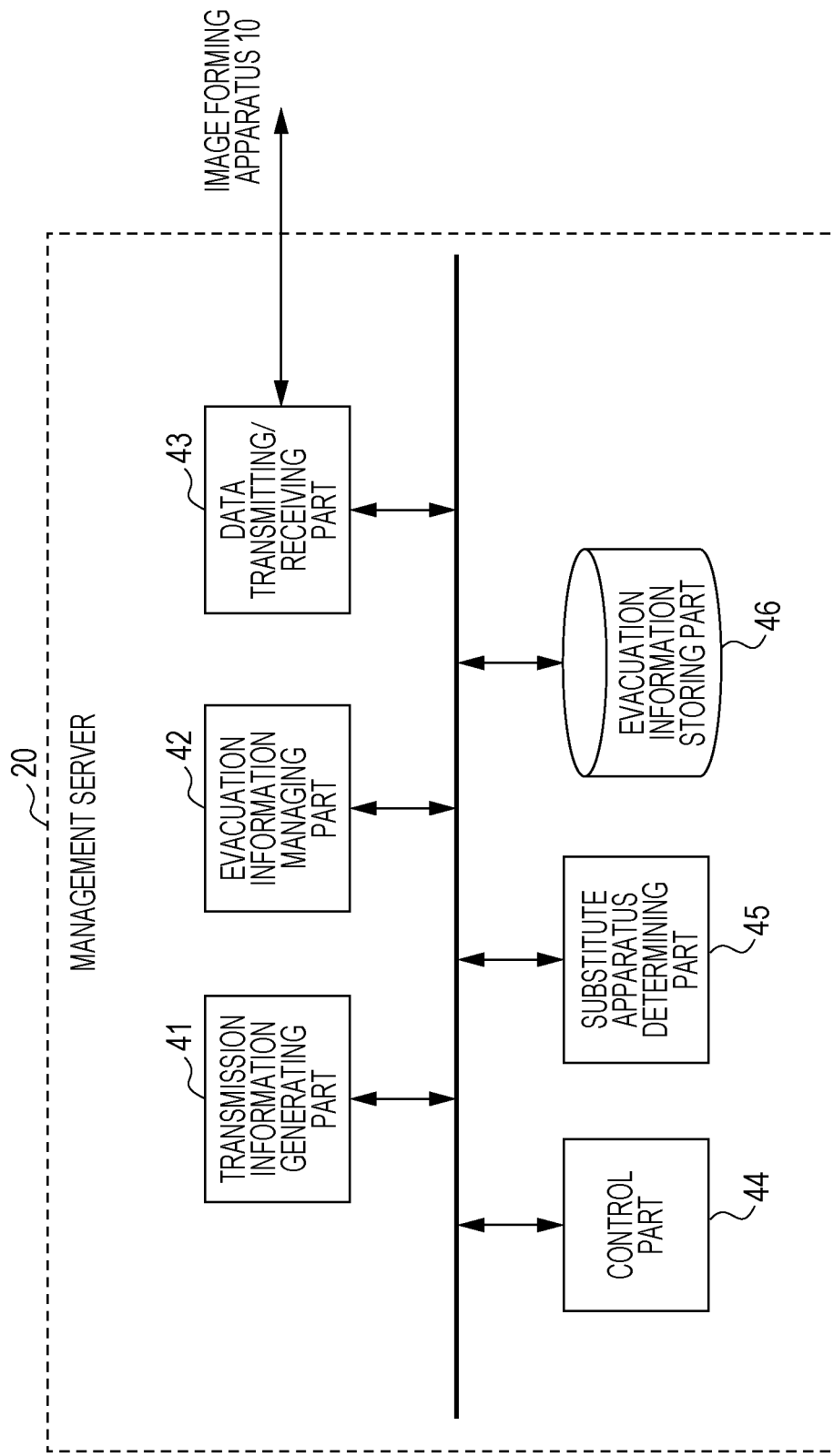
FIG. 6 is a block diagram illustrating the functional configuration of the management server according to the exemplary embodiment of the present disclosure.

FIG. 6 is a block diagram illustrating the functional configuration of the management server 20, which is implemented by executing the control program.

As illustrated in FIG. 6, the management server 20 of this exemplary embodiment includes a transmission information generating part 41, an evacuation information managing part 42, a data transmitting/receiving part 43, a control part 44, a substitute apparatus determining part 45, and an evacuation information storing part 46.

The evacuation information storing part 46 stores an evacuation information management table including basic information such as installation places, installation place categories, and dates of update related to the plurality of image forming apparatuses 10, and pieces of evacuation information to be stored in the plurality of image forming apparatuses 10.

FIG. 7 illustrates an example of the evacuation information management table stored in the evacuation information storing part 46.

The evacuation information management table illustrated in FIG. 7 includes apparatus numbers assigned to the image forming apparatuses 10, basic information such as installation places, installation place categories, and dates of update related to the image forming apparatuses 10, and disaster-related information such as printable evacuation information, substitute apparatus numbers, original evacuation information holding apparatus numbers, and dates of update.

The substitute apparatus refers to an alternative image forming apparatus configured such that, if one image forming apparatus is unable to print evacuation information, the alternative image forming apparatus prints the evacuation information in place of the one image forming apparatus.

The original evacuation information holding apparatus refers to an image forming apparatus whose evacuation information is printable by a substitute apparatus. That is, the original evacuation information holding apparatus refers to an image forming apparatus whose evacuation information is held by a substitute apparatus.

The evacuation information management table includes dates of update of the basic information and dates of update of the disaster-related information.

In the evacuation information management table, no substitute image forming apparatus 10 is preset for a certain image forming apparatus 10. The substitute apparatus is determined by the substitute apparatus determining part 45 in a state in which only basic information is registered in the evacuation information management table.

The substitute apparatus determining part 45 determines, for each of the plurality of image forming apparatuses 10, a substitute image forming apparatus 10 that prints evacuation information in place of the image forming apparatus 10 when the image forming apparatus 10 is unable to print the evacuation information.

For example, the substitute apparatus determining part 45 determines a substitute image forming apparatus installed at a place within a range of a preset distance from a place where an image forming apparatus that is unable to print evacuation information is installed.

At this time, the substitute apparatus determining part 45 determines a substitute image forming apparatus whose installation place category is identical to the installation place category of the image forming apparatus that is unable to print evacuation information.

The reason why the substitute apparatus is determined so that the installation place category of the substitute apparatus is identical to the installation place category of the image forming apparatus in place of which the substitute apparatus prints evacuation information is that a substitute image forming apparatus having a different installation place category may be inaccessible in the event of an actual disaster. That is, if an image forming apparatus whose installation place category is "office" is selected as a substitute apparatus for an image forming apparatus whose installation place category is "convenience store" and if the office is closed or the image forming apparatus is installed at a place that is not accessible to unauthorized persons, they are not allowed to access the image forming apparatus and the substitute apparatus does not exert its function.

This exemplary embodiment is intended for image forming apparatuses installed in convenience stores accessible to anyone even in the event of a disaster. Therefore, an image forming apparatus whose installation place category is "convenience store" is selected as a substitute apparatus for an image forming apparatus whose installation place category is "convenience store".

The evacuation information managing part 42 manages the plurality of image forming apparatuses 10 based on the evacuation information management table. Specifically, the evacuation information managing part 42 performs various types of management such as updating of the evacuation information management table when a new image forming apparatus 10 is installed or an installed image forming apparatus 10 has moved, and updating processing when printable evacuation information is changed. When the basic information or the disaster-related information is updated, the evacuation information managing part 42 rewrites information at a date when each information is updated.

For example, the evacuation information managing part 42 checks updated data every 24 hours and checks all the data every week. If the information in the evacuation information management table is updated, the evacuation information managing part 42 instructs the transmission information generating part 41 to generate transmission information.

The transmission information generating part 41 generates transmission information to be transmitted to each of the plurality of image forming apparatuses 10 based on the evacuation information management table. The transmission information includes information on a substitute apparatus determined by the substitute apparatus determining part 45, evacuation information printable by each image forming apparatus as a substitute apparatus, and evacuation information of an area where each image forming apparatus is installed.

The data transmitting/receiving part 43 transmits the transmission information generated by the transmission information generating part 41 to each of the plurality of image forming apparatuses 10. Further, the data transmitting/receiving part 43 transmits other information to and receives other information from the plurality of image forming apparatuses 10.

The data transmitting/receiving part 43 transmits, to a first image forming apparatus determined as a substitute apparatus for a second image forming apparatus, evacuation information of the second image forming apparatus together with evacuation information printable by the first image forming apparatus.

The image forming apparatus 10 that has received the two types of evacuation information stores, in the evacuation information storing part 37, evacuation information of an area where the image forming apparatus 10 is installed and pieces of evacuation information of other areas.

If the image printing part 38 of each image forming apparatus 10 is able to print evacuation information, the control part 35 controls the display part 33 to display, as information on other areas whose evacuation information is printable, information on installation places of image forming apparatuses for which the image forming apparatus 10 is set as a substitute apparatus.

The control part 44 of the management server 20 controls an overall operation of the management server 20 by controlling the operations of the transmission information generating part 41, the evacuation information managing part 42, the data transmitting/receiving part 43, the substitute apparatus determining part 45, and the evacuation information storing part 46.

Next, an operation of the image forming system of this exemplary embodiment is described in detail with reference to the drawings.

First, an operation for determining a substitute apparatus by the substitute apparatus determining part 45 of the management server 20 is described with reference to a flowchart of FIG. 8.

In Step S101, the substitute apparatus determining part 45 first selects one image forming apparatus from the evacuation information management table illustrated in FIG. 7. If no substitute apparatus is set for any of the image forming apparatuses in the evacuation information management table, the substitute apparatus determining part 45 selects an image forming apparatus having the smallest apparatus number "1".

In Step S102, if the installation place category of the selected image forming apparatus is "convenience store", the substitute apparatus determining part 45 searches for a different image forming apparatus installed at a place categorized as "convenience store" and located within a range of a preset distance, for example, 5 km from a place where the selected image forming apparatus is installed.

In Step S103, the substitute apparatus determining part 45 registers a retrieved image forming apparatus in the evacuation information management table as a "substitute apparatus" for the selected image forming apparatus.

In Step S104, the substitute apparatus determining part 45 registers the selected image forming apparatus as an "original evacuation information holding apparatus" for the image forming apparatus registered as the "substitute apparatus".

For example, if the substitute apparatus determining part 45 selects the image forming apparatus having the apparatus number "1", image forming apparatuses having apparatus numbers "3", "4", and "10" are located within the range of 5 km from the place where the image forming apparatus having the apparatus number "1" is installed. In this case, the apparatus numbers "3", "4", and "10" are registered as apparatus numbers of "substitute apparatuses" for the image forming apparatus having the apparatus number "1". Further, the apparatus number "1" is registered as an apparatus number of an "original evacuation information holding apparatus" for each of the image forming apparatuses having the apparatus numbers "3", "4", and "10".

In the case described above, the substitute apparatus is determined based only on the installation place categories and the distance between the installation places. In actuality, the substitute apparatus for each image forming apparatus is determined based on various geographic conditions such as the number of surrounding convenience stores and the number of image forming apparatuses that may be set as substitute apparatuses.

Until determination is made, in Step S105, that all the image forming apparatuses have been processed, the substitute apparatus determining part 45 sequentially determines substitute apparatuses for all the image forming apparatuses by sequentially changing the apparatus number from "1".

Next, an example of the transmission information to be generated by the transmission information generating part 41 is described with reference to FIG. 9.

FIG. 9 illustrates exemplary transmission information to be transmitted to the image forming apparatus having the apparatus number "1". Similar transmission information is generated for image forming apparatuses having apparatus numbers other than "1".

The transmission information generating part 41 first causes the transmission information to include, as basic information, printable evacuation information to be printed by the image forming apparatus having the apparatus number "1". Then, the transmission information generating part 41 causes the transmission information to include, as supplementary information, information on original evacuation information holding apparatuses and substitute apparatuses.

Specifically, the transmission information generating part 41 first refers to the evacuation information management table illustrated in FIG. 7 to acquire substitute apparatus numbers "3", "4", and "10" for the image forming apparatus having the apparatus number "1" and acquire installation place information of each of the image forming apparatuses having the apparatus numbers "3", "4", and "10". The transmission information generating part 41 causes the transmission information to include those pieces of information as information on substitute apparatuses.

The transmission information generating part 41 refers to the evacuation information management table illustrated in FIG. 7 to acquire original evacuation information holding apparatus numbers "4", "10", "11", and "12" for the image forming apparatus having the apparatus number "1" and acquire installation place information and printable evacuation information of each of the image forming apparatuses having the apparatus numbers "4", "10", "11", and "12". The transmission information generating part 41 causes the transmission information to include those pieces of information as information on original evacuation information holding apparatuses.

The generated transmission information for the image forming apparatus having the apparatus number "1" is transmitted from the management server 20 to the image forming apparatus 10 having the apparatus number "1".

Next, description is made of an example of display control to be performed by the image forming apparatus 10 that has received the transmission information illustrated in FIG. 9.

The image forming apparatus 10 holds display control information illustrated in FIG. 10 and performs display control based on the display control information.

In the display control information illustrated in FIG. 10, determination is made as to whether the display mode is "normal" or "disaster" and whether the printability is "Yes" or "No".

Figure 11:
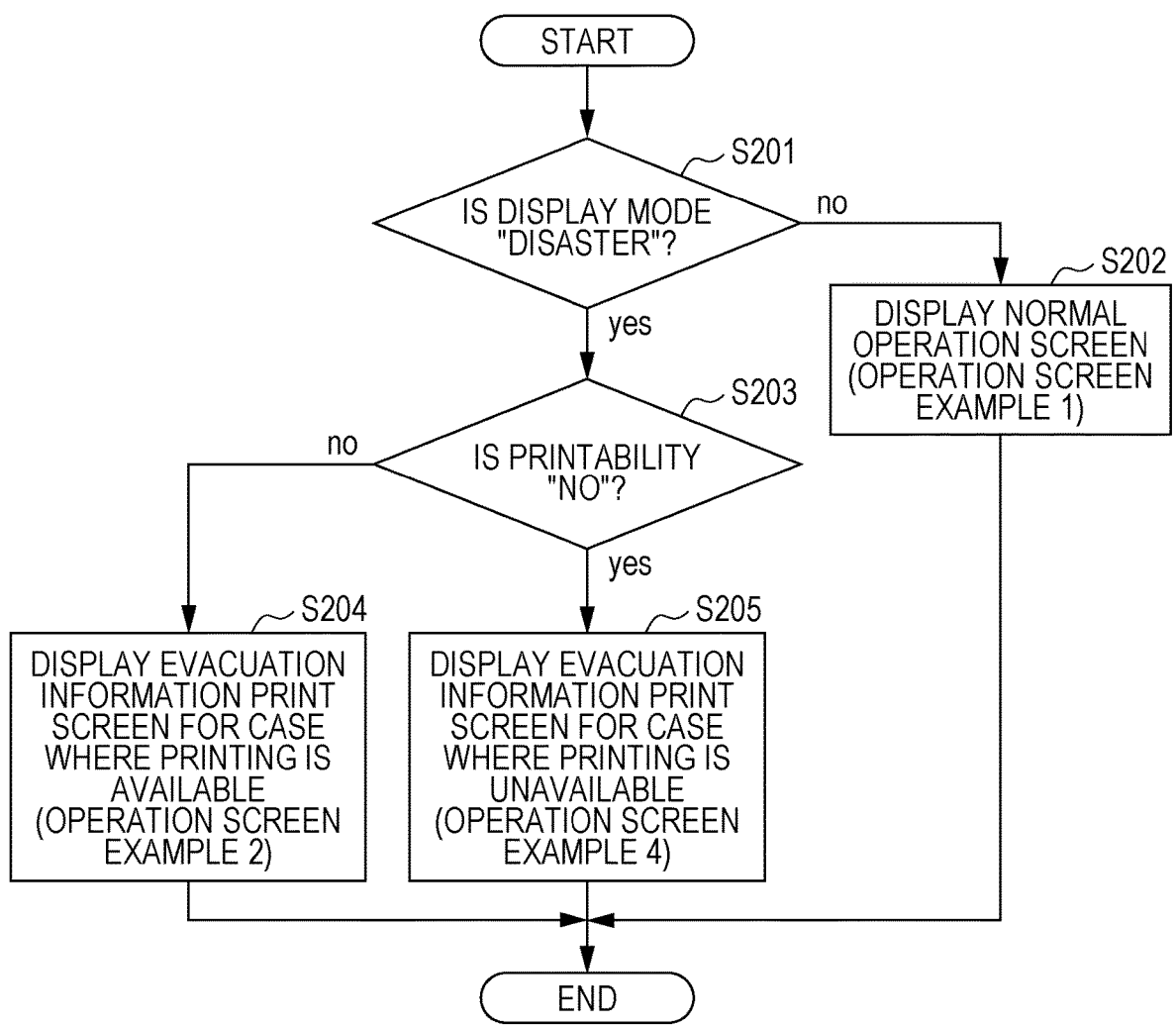
FIG. 11 is a flowchart for illustrating processing for determining an operation screen of the image forming apparatus, which is controlled based on the display control information.

Referring to a flowchart of FIG. 11, description is made of processing for determining an operation screen of the image forming apparatus 10, which is controlled based on the display control information illustrated in FIG. 10.

In Step S201, the image forming apparatus 10 first determines whether the display mode is "disaster" or "normal".

Figure 12:
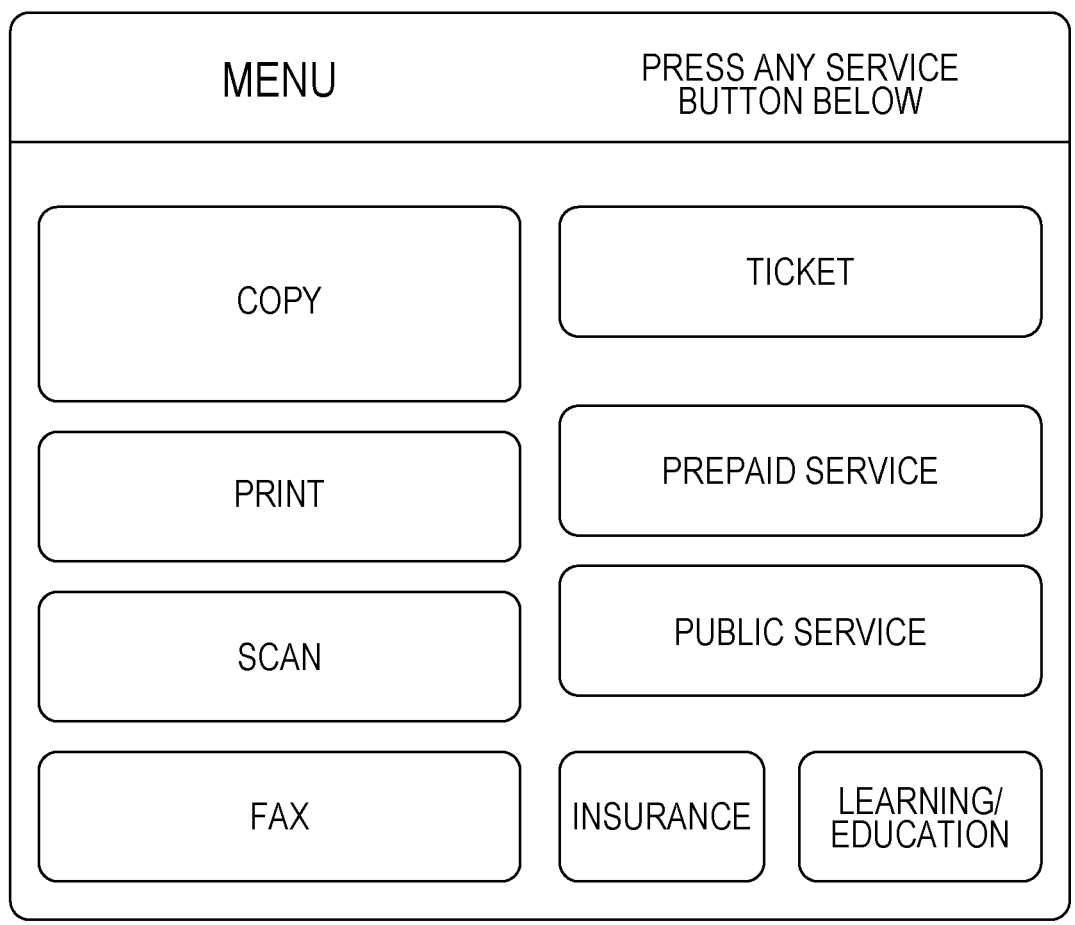
FIG. 12 illustrates Operation Screen Example 1 showing an operation screen to be displayed on the image forming apparatus.

If the image forming apparatus 10 determines that the display mode is "normal" in Step S201, the image forming apparatus 10 displays a normal operation screen in Step S202. FIG. 12 illustrates the displayed normal operation screen as Operation Screen Example 1. In FIG. 12, the image forming apparatus 10 displays the normal operation screen when no disaster occurs.

If the image forming apparatus 10 determines that the display mode is "disaster" in Step S201, the image forming apparatus 10 determines whether the printability is "No" or "Yes" in Step S203.

Figure 13:
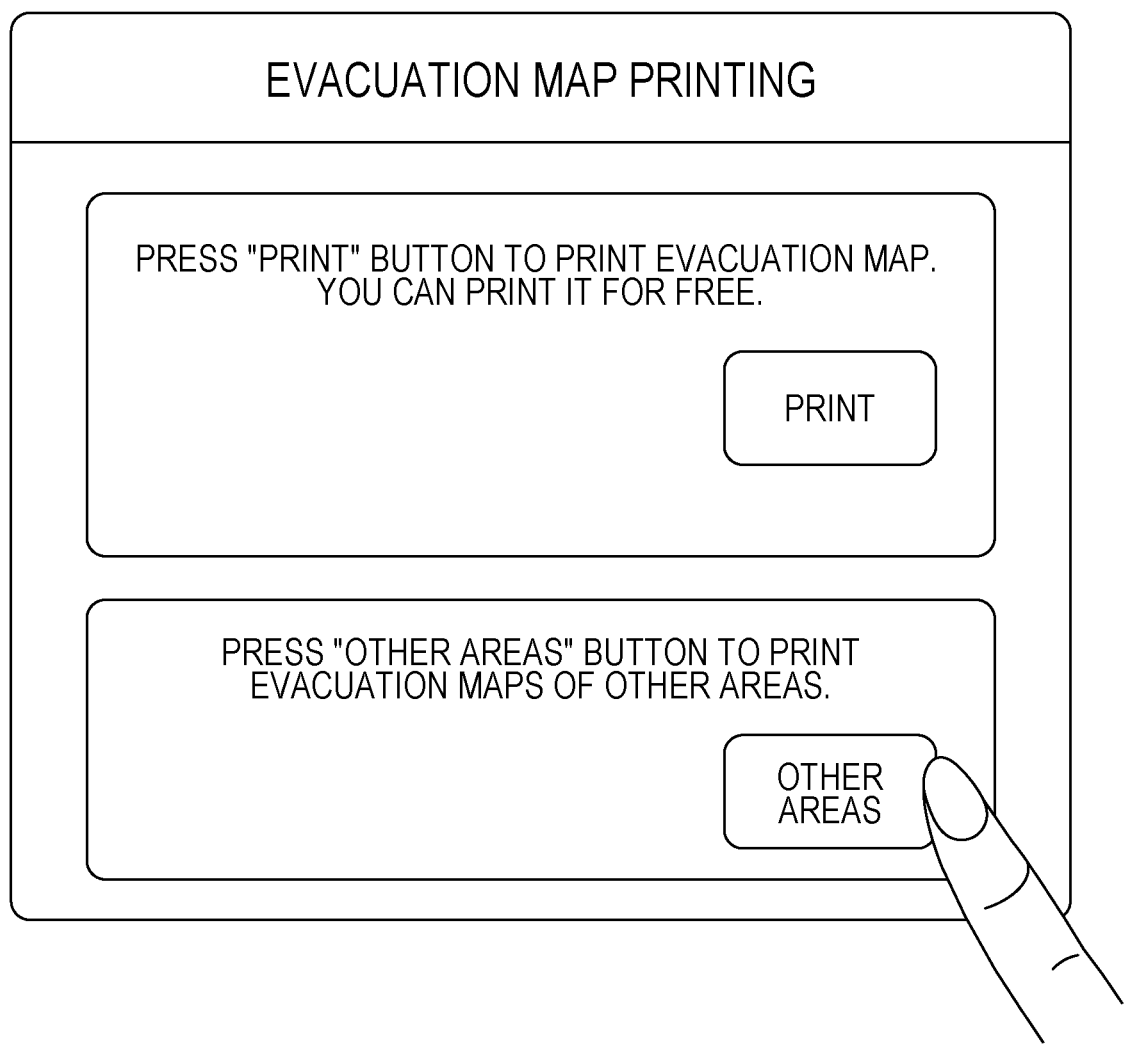
FIG. 13 illustrates Operation Screen Example 2 showing an operation screen to be displayed on the image forming apparatus.

If the image forming apparatus 10 determines that the printability is "Yes" in Step S203, the image forming apparatus 10 displays, in Step S204, an evacuation information print screen for a case where printing is available. FIG. 13 illustrates the displayed evacuation information print screen as Operation Screen Example 2. In FIG. 13, a print button is displayed for printing of evacuation information of an area where the image forming apparatus 10 is installed. When a user who comes to the convenience store in the event of a disaster operates the print button, the evacuation information illustrated in FIG. 2 is printed and the user may obtain the evacuation information.

In Operation Screen Example 2 illustrated in FIG. 13, an "other areas" button is displayed. When a user operates the "other areas" button, an operation screen of Operation Screen Example 3 is displayed as illustrated in FIG. 14.

Figure 14:
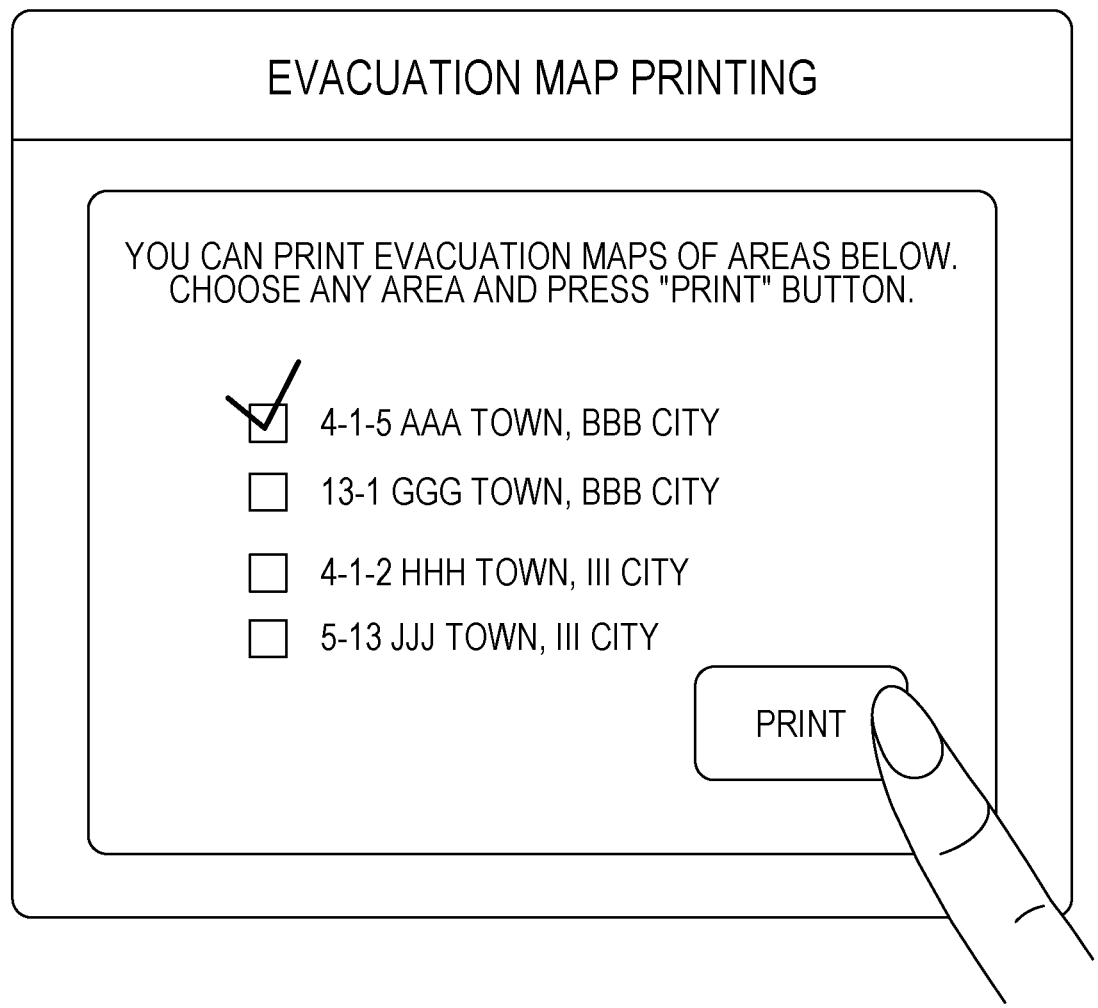
FIG. 14 illustrates Operation Screen Example 3 showing an operation screen to be displayed on the image forming apparatus.

In Operation Screen Example 3 illustrated in FIG. 14, an information list is displayed for other areas whose evacuation information is printable by the image forming apparatus 10. When a user selects a desired area and operates a print button, evacuation information of the selected area may be printed.

Specifically, a user wants to obtain evacuation information of a first area and uses an image forming apparatus installed in a convenience store of the first area but printing is unavailable in the image forming apparatus due to lack of paper or the like. In this case, the user may come to a convenience store of a second area where a substitute apparatus is installed by referring to its installation place information. Thus, the user may print the evacuation information of the first area.

If the image forming apparatus 10 determines that the printability is "No" in Step S203, the image forming apparatus 10 displays, in Step S205, an evacuation information print screen for a case where printing is unavailable. FIG. 15 illustrates the displayed evacuation information print screen as Operation Screen Example 4. In FIG. 15, the evacuation information print screen shows that the image forming apparatus 10 is unable to print evacuation information of the area where the image forming apparatus 10 is installed due to lack of paper or the like, and shows installation place information of other image forming apparatuses that are able to print the evacuation information of this area in place of the image forming apparatus 10.

Specifically, a user who has encountered the operation screen illustrated in FIG. 15 may be informed that the user may obtain desired evacuation information by using a different image forming apparatus installed at a place displayed on the screen.

Figure 16:
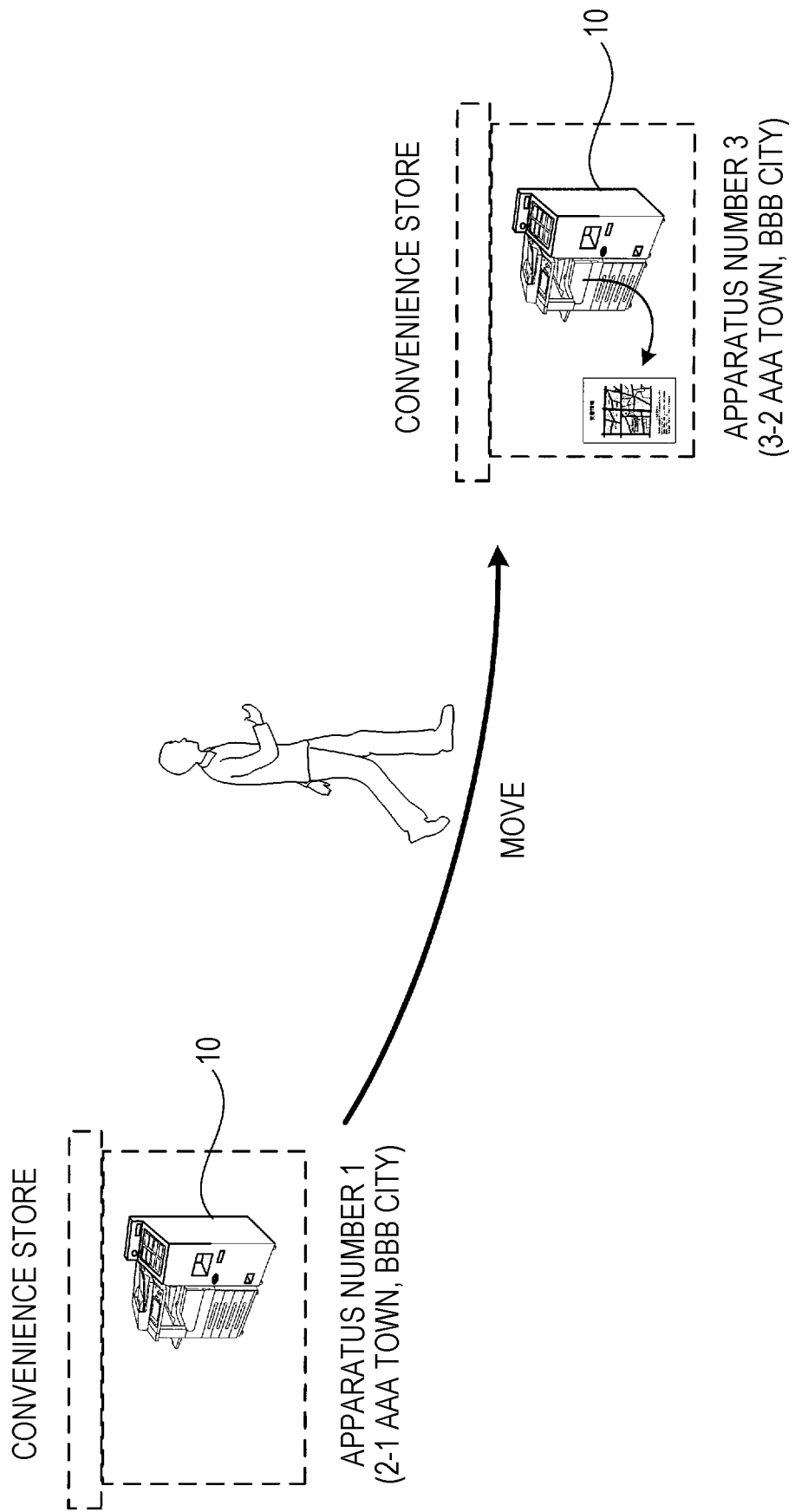
FIG. 16 illustrates how a user moves from a convenience store at "2-1 AAA Town, BBB City" where an image forming apparatus having an apparatus number "1" is installed to a convenience store at "3-2 AAA Town, BBB City" where an image forming apparatus having an apparatus number "3" is installed.

For example, as illustrated in FIG. 16, a user wants to obtain evacuation information of an area "2-1 AAA Town, BBB City" where the image forming apparatus 10 having the apparatus number "1" is installed but printing is unavailable in the image forming apparatus 10 having the apparatus number "1". In this case, the user views the operation screen illustrated in FIG. 15 and goes to a convenience store in an area "3-2 AAA Town, BBB City" to print the desired evacuation information by using the image forming apparatus 10 having the apparatus number "3".

[Modified Example]

In the exemplary embodiment described above, the substitute apparatus is determined among the image forming apparatuses whose installation place categories are "convenience store". The substitute apparatus may be determined among image forming apparatuses having various installation place categories.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus, comprising:
 a memory that stores evacuation information for use in an event of a disaster;
 a printer that prints the evacuation information stored in the memory in the event of a disaster; and
 a display controller that performs, if the printer is unable to print the evacuation information, control to display information on an installation place of a different image forming apparatus that is able to print the evacuation information in place of the image forming apparatus,
 wherein a first evacuation information of a first area where the image forming apparatus is installed, and a second evacuation information of a second area other than the first area is stored, and wherein, if the printer is able to print evacuation information, information on the second area for printing of the second evacuation information is displayed.

2. A management apparatus, comprising:
 a storage that stores pieces of information on installation places of a plurality of image forming apparatuses, and pieces of evacuation information to be stored in the plurality of image forming apparatuses;
 a determiner that determines, for each of the plurality of image forming apparatuses, a substitute image forming apparatus that prints evacuation information in place of each of the plurality of image forming apparatuses when each of the plurality of image forming apparatuses is unable to print the evacuation information; and a transmitter that transmits, to each of the plurality of image forming apparatuses, information on the substitute image forming apparatus determined by the determiner, evacuation information printable by each of the plurality of image forming apparatuses as a substitute image forming apparatus, and evacuation information of an area where each of the plurality of image forming apparatuses is installed.

3. The management apparatus according to claim 2, wherein the substitute image forming apparatus determined by the determiner is installed at a place within a range of a preset distance from a place where an image forming apparatus that is unable to print evacuation information is installed.

4. The management apparatus according to claim 3, wherein an installation place category of the substitute image forming apparatus determined by the determiner is identical to an installation place category of an image forming apparatus that is unable to print evacuation information.

5. An image forming system, comprising:
  a management apparatus comprising:
    a storage that stores pieces of information on installation places of a plurality of image forming apparatuses, and pieces of evacuation information to be stored in the plurality of image forming apparatuses;
    a determiner that determines, for each of the plurality of image forming apparatuses, a substitute image forming apparatus that prints evacuation information in place of each of the plurality of image forming apparatuses when each of the plurality of image forming apparatuses is unable to print the evacuation information; and
    a transmitter that transmits, to the each of the plurality of image forming apparatuses, information on the substitute image forming apparatus determined by the determiner, evacuation information printable by each of the plurality of image forming apparatuses as a substitute image forming apparatus, and evacuation information of an area where each of the plurality of image forming apparatuses is installed; and
  image forming apparatuses each comprising:
    a memory that stores evacuation information and information on a substitute image forming apparatus, which are transmitted from the management apparatus;
    a printer that prints the evacuation information stored in the memory in an event of a disaster; and
    a display controller that performs, if the printer is unable to print the evacuation information, control to display information on an installation place of the substitute image forming apparatus that is able to print the evacuation information in place of the image forming apparatus.

6. The image forming system according to claim 5, wherein the transmitter transmits, to a first image forming apparatus determined as a substitute image forming apparatus for a second image forming apparatus, first evacuation information of a first area where the first image forming apparatus is installed, and second evacuation information of a second area where the second image forming apparatus is installed,
wherein the memory stores the first evacuation information and the second evacuation information, and
wherein, if the printer is able to print evacuation information, the display controller displays information on an installation place of the second image forming apparatus as information on the second area for printing of the second evacuation information.

7. A non-transitory computer readable medium storing a program causing a computer to execute a process comprising:
  storing evacuation information for use in an event of a disaster; and
  performing, if an image forming apparatus is unable to print the stored evacuation information in the event of a disaster, control to display information on an installation place of a different image forming apparatus that is able to print the evacuation information in place of the image forming apparatus,
  wherein the memory stores first evacuation information of a first area where the image forming apparatus is installed, and second evacuation information of a second area other than the first area, and
  wherein, if the printer is able to print evacuation information, the display controller displays information on the second area for printing of the second evacuation information.

* * * * *